April 7, 1970  R. W. MARTEL  3,504,969
IMAGING APPARATUS

Filed May 2, 1966  2 Sheets-Sheet 1

INVENTOR.
ROBERT W. MARTEL

BY
James J. Ralabate
ATTORNEY

April 7, 1970

R. W. MARTEL 3,504,969

IMAGING APPARATUS

Filed May 2, 1966

INVENTOR.
ROBERT W. MARTEL

BY James J. Ralabate

ATTORNEY

United States Patent Office 3,504,969
Patented Apr. 7, 1970

3,504,969
IMAGING APPARATUS
Robert W. Martel, Webster, N.Y., assignor to Xerox Corporation, Rochester, N.Y., a corporation of New York
Filed May 2, 1966, Ser. No. 546,725
Int. Cl. G03g 15/00
U.S. Cl. 355—16                                    4 Claims

ABSTRACT OF THE DISCLOSURE

An image conversion system is disclosed which is capable of converting information in the form of uncontrolled originals into an image which may be reproduced utilizing conventional printout systems. A means for developing an electrostatic latent image using conventional techniques and means for exposing said resulting image to a radiation sensitive image support member are provided. The means for exposing said member comprises an infrared, an ultraviolet and visible radiation source.

This invention relates to an imaging system, and more specifically to a radiation sensitive imaging system.

A practical image formation system should fulfill certain basic requirements. To be efficient, it should be sensitive to the radiation to be utilized, the image formed should be sensitive to the radiation to be utilized, the image formed should relate itself to the area where the radiation affected the system, and the end product should be reasonably stable and be retained for the desired time of use. In addition, the image should be produced in amount proportional to the varied amounts of radiation received by the system. The end use of the system dictates the degree to which the above factors apply. An ideal imaging process is one which has sufficient speed to record a latent image by projection and, in addition, is generally sensitive to wave-lengths of the visible spectrum, i.e., from about 4,000 to about 7,000 angstrom units. The original document which is selected to be copied or reproduced is either in a transparent or opaque form. Transparent original documents may be copied either by projection or contact means, in either case, however, the original document is one which is printed only on one side. Opaque original documents can be satisfactorily reproduced generally by contact reflex or projection techniques. In the latter instance, reflected light is captured by a lens and mirror system and subsequently projected onto the imaging means. As a result of the loss of radiation during the reflection and transmission phases of the projection system, the copying of opaque original documents generally requires approximately 50 times more incident radiation upon the document than that necessary when copying transparencies. However, the reproduction of opaque documents by the projection system of imaging allows for the copying of two-sided documents, each side being reproduced independently.

A number of radiation sensitive image-forming systems are known, most of which are generally sensitive to the ultraviolet and visible radiations, although some methods employ other wave-length bands. For example, one such system utilizes photochromic materials as the source of image potential. Photochromic materials are basically spectral, light-sensitive days which exhibit reversible spectral changes upon exposure to radiant energy in the near ultraviolet and visible portions of the electromagnetic spectrum. Upon exposure to radiation, elementary changes from either the colored or the colorless state occur within the dye. The normal state of photochromic materials is the transparent or colorless state. Upon exposure to the necessary radiation, the colorless state of the photochromic material will assume the colored or opaque state. If the original colorless state is again desired, the opaque state can be reversed by subsequent exposure to heat or visible light of the proper wave-length distribution. Preferably, the photochromic materials are considered most effective in the ultraviolet or near ultraviolet range of the spectrum. Thermographic processes rely upon a mechanism whereby copy material containing dark images will radiate heat in the image areas upon exposure to, an absorption of infrared radiation. The system is such that, generally, two or more compounds separated from each other and dispersed in a suitable medium react with each other upon exposure to the proper thermal energy thereby allowing the compounds to react. The image areas of the document to be reproduced absorb the energy and transmit the heat to corresponding areas in the thermographic sheet thereby activating the heat sensitive materials. Still another radiation sensitive system, the diazo process, operates on the principle that when a diazonium salt is exposed to radiation, it is decomposed thereby producing a relatively colorless and inactive composition. Upon exposure to radiation in the ultraviolet and violet range of the spectrum, the decomposition reaction occurs and the unexposed portion of the diazo material is later reacted with a "coupler" thereby producing a visible dye.

While these and other techniques have been found useful as image formation systems, there are inherent limitations and disadvantages to their use. Generally speaking, the diazo and photochromic materials are of such a nature that the speeds at which they respond in proportion to the amount of radiation required to bring about the above-described reactions are insufficient to make them practically useful in a projection system. Therefore, there exists the disadvantage that when using the diazo and photochromic systems, it is generally necessary that the original document to be reproduced be a transparency, i.e., one which is transparent in the required areas to the radiation to which the materials of these systems are sensitive. A further disadvantage to the use of these systems is that due to the fact that the energy requirement which would be necessary to adapt these two mechanism to a projection system is usually prohibitive, contact imaging is desirable. Therefore, the documents to be reproduced must be as a general rule be one-sided documents. An additional disadvantage is that there are certain printing materials or dyes which are not responsive to the spectral energy used in conjunction with these systems. Lacking the necessary light filtering properties, images consisting of these dyes are not usually reproducible in the photochromic and diazo systems. The thermographic imaging process on the other hand, although not suitable for projection imaging for reasons similar to those discussed above in relation to the diazo and photochromic processes may be useful when copying two-sided documents by employing the well-known "contact reflex" imaging technique. A disadvantage to the use of the thermographic imaging process is that the infrared radiation to which the thermographic materials are responsive is not absorbed, according to the requirements of the process, by certain hard copy materials, thereby limiting the use of thermography to those specific systems which respond thereto.

It is therefore, an object of this invention to provide an imaging system which will overcome the above-noted disadvantages.

It is a further object of this invention to provide a process of using a novel imaging system.

Another object of this invention is to provide a continuous radiation sensitive imaging system capable of image reproduction by way of projection imaging.

Still a further object of this invention is to provide a novel radiation sensitive imaging system capable of two-sided document reproduction.

Yet, still a further object of this invention is to provide a novel continuous image conversion apparatus.

An additional object of this invention is to provide a continuous imaging system having both print-out and display capabilities.

The foregoing objects and others are accomplished in accordance with this invention, generally speaking, by providing an imaging system whereby the surface of an electrostatically charged photoconductive continuous member, such as a cylinder or endless belt, is selectively exposed to a light source thereby producing in imagewise configuration an electrostatic latent image on the surface of the member. The electrostatic latent image is then developed with electroscopic marking particles or toner. This xerographic imaging process is more fully described in U.S. Patent 2,297,691. The photoconductive member consists of a thin transparent conductive support composed of a layer of an optically transparent base, coated with an optically transparent layer of conductive material, such as tin oxide. It is preferred that the support be from about 3.5 to about 60 mils in thickness in order to allow for maximum light transmission. However, the thickness of the support will vary considerably depending upon the transparency properties of the particular materials being employed. At least one surface of the transparent conductive support is coated with a transparent photoconductor material such as doped polyvinyl carbazole. Although the thickness of the photoconductor layer may range from about 1–95 microns, it is preferred for maximum efficiency and optimum results to operate within a range of from about 2–10 microns. Following the development of the electrostatic latent image with electroscopic marking particles, the developed image is exposed by way of an exposure unit to a radiation sensitive print-out image support member. The exposure unit is so arranged that it will provide that radiation in the electromagnetic spectrum dictated by the specific radiation sensitive print-out process employed in the system. The developer or toner material is such that it will satisfy the necessary radiation requirements of the print-out exposure unit whether it be in the ultra-violet, infrared, or the visible spectrum. When the developed image reaches the exposure station, it is subjected to contact exposure under intense radiation to a radiation sensitive image support member, such as a diazo, thermographic, or photochromic radiation sensitive sheet and an image of the original document is produced according to the respective mechanism as described above. Prior to exposure to the radiation sensitive image support member, a light source may be installed for display purposes. Following the contact printing of the film material, the image on the surface of the drum is removed and the photoconductive surface prepared for a new cycle.

It has been found, in accordance with the present invention, that copies from uncontrolled originals such as documents and books may be made utilizing well-known radiation sensitive print-out systems, such as the diazo, thermographic, and photochromic processes, which up until the present time have been limited as discussed above one way or the other as to the extent of their usefulness. The photochromic and diazo processes generally require the copying of one-sided, transparent information sources. In the case of the thermographic copying system, although copies of two-sided documents may be reproduced utilizing the well-known "contact reflex" technique of imaging, the final quality of the resulting thermographic images make this system generally undesirable. By utilizing the procedure of the present invention, it is possible to convert an uncontrolled original, by means of the projection of reflection copy utilizing radiation energy in the visible spectrum, to that of an image which may be reproduced in high resolution by contact printing of film material utilizing among others, diazo, photochromic and thermographic processes. As a result of the present invention, a simple, completely dry system becomes possible.

The invention is illustrated in the accompanying drawings wherein.

Figure 1:
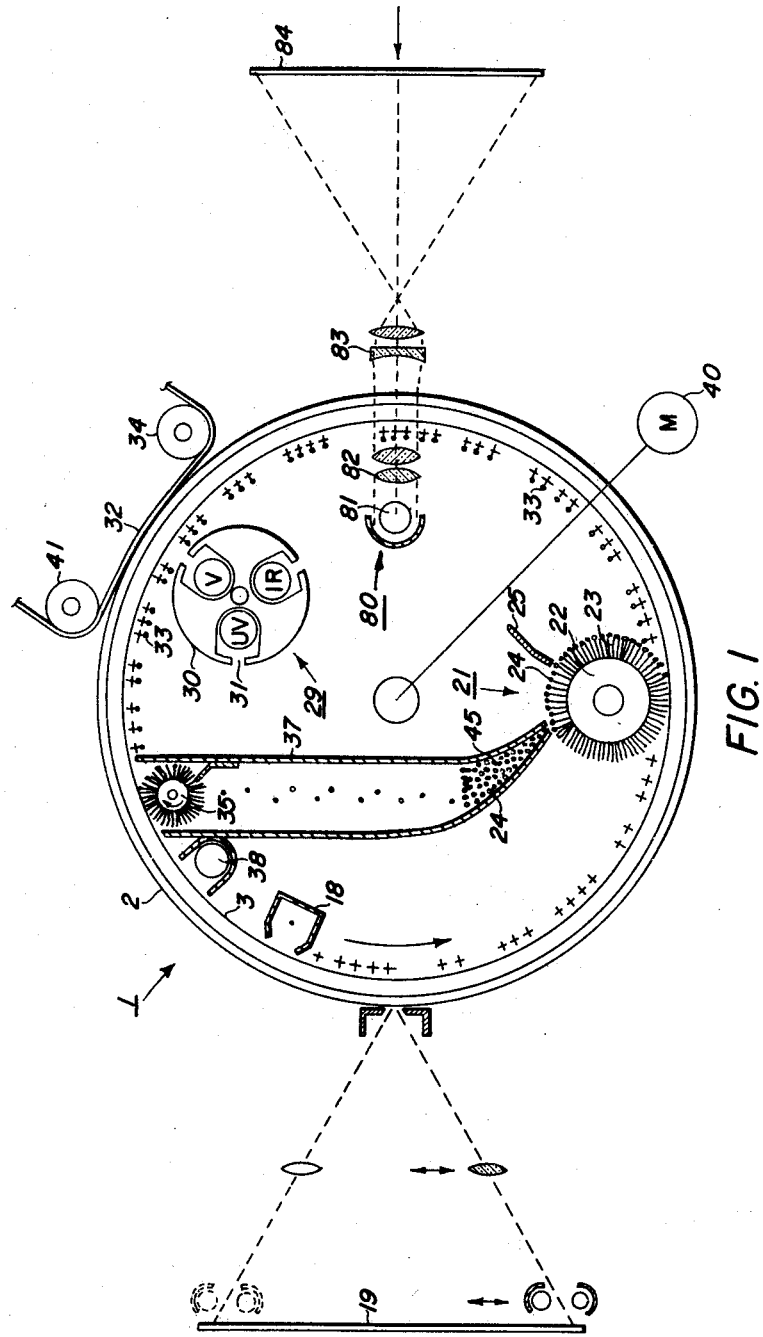
FIGURE 1 represents a side sectional view of an exemplary continuous image conversion apparatus of the present invention.

Referring now to FIG. 1, there is seen a rotary transparent cylinder 1, which in this instance, consists of a transparent conductive support 2 which is made up of a layer of optically transparent glass having coated on its inner surface a thin optically transparent conductive layer of tin oxide, and a transparent photoconductor 3. The oxide coated glass of this nature is commercially available under the trade name NESA glass, from the Pittsburgh Plate Glass Company. The cylinder, when in operation, is generally rotated by drive means 40 at a uniform velocity in the direction indicated by the arrow so after portions of the inner surface of the cylinder pass the charging unit 18 and have been uniformly charged, they come beneath a scanning imaging mechanism 19 or other means for exposing the charged plate to the image to be reproduced. Subsequent to charging and exposure, sections of the cylinder's inner surface move past the developing unit generally designated 21. This developing unit is of the brush type which includes a roller 22 with bristles 23 extending therefrom which contact the surface of the cylinder bearing the electrostatic latent image and serve as the carrier for the toner particles 24. The particles are triboelectrically charged by contacting a striking plate 25 mounted to strike the brush fibers prior to their meeting the image surface. The plate is generally an electrically grounded metallic plate. As the electrostatic latent image passes beneath the brush-like arrangement, the toner 24 is deposited on the electrostatic latent image. This development technique is more fully described in copending U.S. Patent application, Ser. No. 401,811, filed Jan. 4, 1954.

After passing the development unit, the xerographic cylinder or drum passes to display mechanism generally designated 80 comprising light source 81, double lens condenser complex 82 and a projection lens 83 provided to project the image onto the surface of display screen 84, to be viewed in the direction of the arrow and then continues around to the contact slit exposure station generally designated 29, consisting of exposure unit 30, exposure slit 31, and print-out web or image support member 32. The unit which provides the source of radiation is so selected that it will correspond to the particular print-out radiation sensitive system with which the xerographic conversion apparatus is being employed. The exposure unit 30 consists of ultraviolet (UV), infrared (IR) and visible (V) radiation sources. The print-out web 32 is mounted on feed and take up rollers 34 and 41 respectively, which are rotated at the same speed as the periphery of the drum. The web is contacted with the surface of the drum at the position of the exposure of the developed image 33. Following contact exposure of the developed image 33 to the selected light source provided by unit 30, the image continues around by way of the rotating drum and passes beneath a cleaning brush 35 which removes the toner particles with the assistance of flicker bar 36 from the surface of the drum thereby preparing it for a new cycle of operation. The toner particles are deposited by way of conduit 37 to reservoir 45 and in turn onto the surface of the developing unit 21 thereby providing a continuous, reusable toner supply. A discharge lamp 38 is situated internal to the conversion cylinder to insure complete dissipation of the electrostatic charge.

Figure 2:
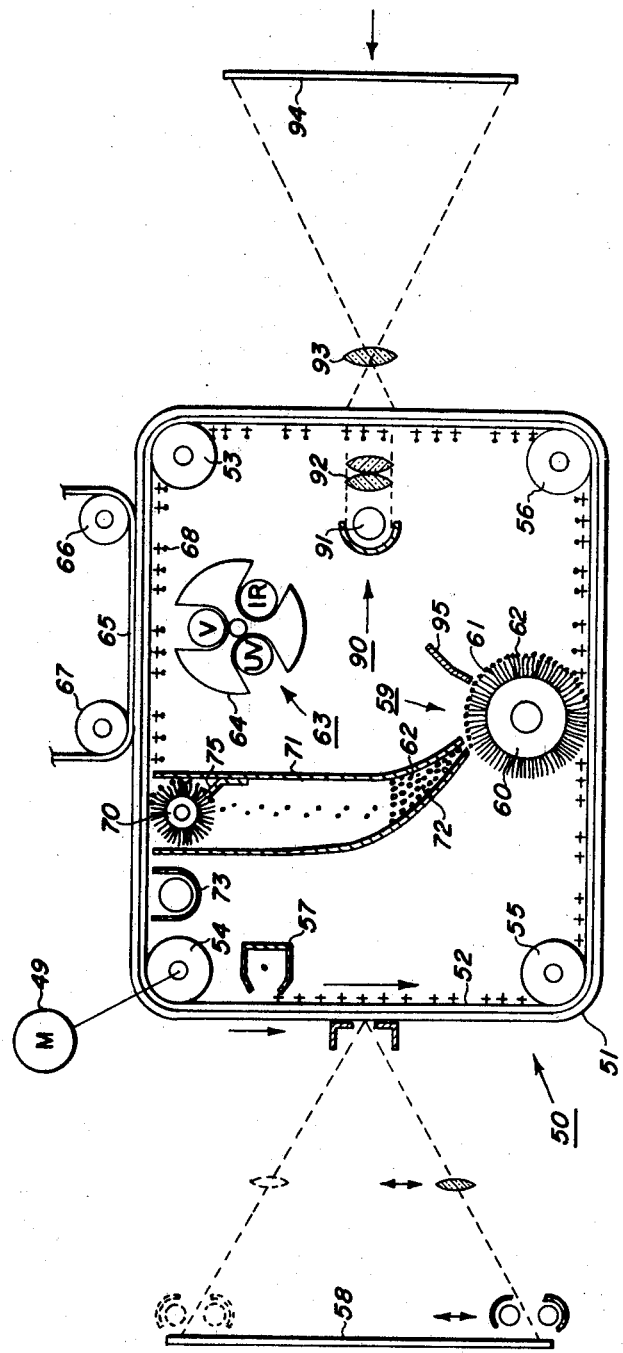
FIGURE 2 represents an alternate embodiment of the apparatus of the present invention in an endless belt configuration.

In FIGURE 2, there is seen an endless transparent belt 50 which, in this instance, consists of a transparent conductive support 51 comprising an aluminized Mylar sheet, a polyethylene terephthalate, commercially available from E. I. du Pont de Nemours & Company, and a transparent photoconductor 52. The belt 50, when in operation, is generally driven at a uniform velocity by any suitable means, such as by motor 49, in the direction indicated by the arrow, the endless transparent belt being supported by rollers 53, 54, 55 and 56, with the motor being connected to one or more of the rollers. The support rollers contact only the edges of the endless belt, thereby allowing the system to operate while avoiding contact with the working surface of the belt. After portions of the inner surface of the belt pass the charging unit 57 and have been uniformly charged, they come beneath a scanning imaging mechanism 58 similar to that shown in FIGURE 1. Following the charging and exposure steps, the imaged belt moves past the developing unit generally designated 59. As in the embodiment disclosed in FIGURE 1, the developing unit is of the brush type which includes a roller 60 with bristles 61 extending therefrom which contact the surface of the belt supporting the electrostatic latent image and stricking bar 95. As the latent image passes beneath the development unit the toner 62 is deposited in image-wise configuration. After passing the developing unit, the xerographic belt passes to display unit geenrally designated 90 comprising light source 91, double lens condenser complex 92 and a projection lens 93 provided to project the image onto the surface of display screen 94 to be viewed in the direction of the arrow. After passing the display unit the imaged belt continues around to the contact exposure station generally designated 63 consisting of exposure unit 64, and print-out web 65. The exposure unit in this embodiment, as a result of the flat exposure area, is adaptable to full frame exposure. The print-out web 65 is mounted on feed and take-up rollers 66 and 67 respectively, which are rotated at the same speed as the endless belt. The web is contacted with the surface of the belt at the position of the exposure of the developed image 68. Following contact exposure of the developed image to the selected light source the image continues around by way of the belt arrangement and passes beneath cleaning brush 70 which removes the toner particles with the aid of flicker bar 75 from the inner surface of the belt thereby preventing it for a new cycle of operation. The toner particles are deposited by way of conduit 71 to reservoir 72 and then in turn onto the surface of the developing unit 59. A discharge lamp 73 is situated internal to the endless belt apparatus to insure complete dissipation of the electrostatic charge.

Although the invention has been described in connection with corona charging, it is to be understood that this is exemplary only and that the electrophotographic cylinder may in fact be employed with any suitable charging technique. Other typical charging methods include friction charging and induction charging as described in U.S. Patents 2,934,649 and 2,833,930 and roller charging as described in U.S. Patent 2,934,650. Likewise, although the invention has been described in conjunction with a triboelectric brush development technique, any suitable development means may be used in the course of this invention. Typical development systems are cascade development, more fully described in U.S. Patents 2,618,551 and 2,618,552, and powder cloud development, more fully described in U.S. Patents 2,725,305 and 2,918,910.

It is desirable that the transparent conductive support of the present invention including the photoconductive layer be of such a thickness that it allows for maximum transmission of light both at the input stage of the imaging cycle and at the output or exposure station. In the latter instance, it is important that the conductive support and phooconductor be relatively transparent to that wavelength of light to which the particular print-out mechanism used is sensitive. The thickness of the conductive support may range from about 2 to about 80 mils. It is preferred, however, for maximum efficiency and transmission that the thickness of the support be maintained from about 3.5 to 60 mils. For similar reasons, it is desirable to limit the thickness of the photoconductive layer to about 1 to 95 microns, preferably for optimum results from about 2 to 10 microns.

Any suitable optically transparent conductive support which will satisfy the requirements of the present invention may be used. When used in the course of this invention, the expression optically transparent conductive support is meant to include an optically transparent base coated with a film of a transparent conductive composition. Typical support materials are Surlyn-A, a thermoplastic ethylene polymer containing both organic and inorganic components linked by a covalent bond, commercially available from E. I. du Pont de Nemours Company, coated with a conductive tetracyanoquinodimethane complex commercially available from Eastman Kodak Co.; optically transparent glass coated with conventional conductive materials such as tin oxide, copper, copper iodide, gold, or similar materials; and metallized transparent films, such as cellulose acetate (optical grade), polyesters such as Mylar, a polyethylene terephthalate commercially available from E. I. du Pont de Nemours & Co., and polycarbonates, such as Plestar, commercially available from General Aniline and Film Company, overcoated by any suitable means such as by vacuum deposition, with a metal coating such as aluminum, copper, gold, silver or chromium. The metallized transparent films, specifically the polyethylene terephthalate, are preferred inasmuch as they are more readily adapted to the spectral variations of the present invention, thereby lending flexibility to the function of the xerographic conversion apparatus herein described.

Any suitable transparent photoconductor which will satisfy the radiation requirements of the present invention may be used. Typical photoconductive materials are doped polyvinyl carbazole, doped polycarbonates, selenium, selenium-tellurium alloys, selenium-arsenic alloys, cadmium sulfoselenide, phthalocyanine compositions, and mixtures thereof. The doped polyvinyl carbazole and polycarbonate resins are preferred inasmuch as they are more readily and universally adaptable to the thickness and sensitivity requirements of the present invention. Typical doping agents which may be used with the polyvinyl carbazole and polycarbonate photoconductive materials mentioned above are 2,4,7-dicyano trinitrofluorene, 2,4,7-trinitrofluorenone, tetrachlorophthalic anhydride, tetrachloro-p-benzoquinone and mixtures thereof.

The toner material of the present invention comprises finely divided pigmented resin particles having a particle size generally less than about 20 microns and preferably between about 5 to 15 microns in average particle size in order to obtain optimum results. The pigment is present in the resinous toner in sufficient quantity so as to satisfy the spectral energy distribution requirements of the light sources used during the secondary imaging phase of the present invention and thereby absorb the radiation accordingly. Typical such pigments are titanium dioxide, carbon black, e.g., lamp black, channel black, furnace black, etc., white lead, zinc oxide, cadmium red, phthalocyanine blue, calcium carbonate, calcium silicate, and mixtures thereof. Preferably, the various carbon black pigments are generally used because they provide substantially ideal imaging conditions under the radiation requirements of the present invention. Desirably, the pigment is employed in an amount of at least about 5% based on the total weight of the toner and generally between about 5 to about 10% to obtain optimum results.

It has been ascertained that in order to develop a latent image comprised of negative electrostatic charges, an electroscopic powder and carrier combination should be selected in which the powder is triboelectrically positive to the carrier, and to develop a latent image comprised of positive electrostatic charges, an electroscopic powder and carrier should be selected in which the powder is triboelectrically negative to the carrier. Therefore, any suitable electroscopic toner or powder may be used in the course of the present invention which does not fuse under the present operating conditions and which satisfies the triboelectric relationship with the particular carrier that is used. Typical toner powders are styrene polymers, and copolymers, including substituted styrene such as the Piccolastic resins commercially available from the Pennsylvania Industrial Chemical Corporation, phenol formaldehyde resins, acrylonitrile resins, polytetrafluoroethylene, as well as other resins having similar properties, such as those disclosed in U.S. Patents 2,788,288; 3,079,-342; and Re. 25,136. When the preferred brush development technique is used, then the toner particles should be selected so that they are properly situated in the triboelectric series with respect to the brush composition so as to satisfy the charge requirements dictated by the charge of the electrostatic latent image. When exposure of the developed image to an infrared radiation source is desired, it is generally preferred, in order to avoid the possibility that the developed image will become permanently affixed to the surface of the drum, that the toner particles have a fusing point generally above about 250 to 300° F.

When suitable, liquid developers may also be used in the course of this invention. Typical such developers are disclosed in U.S. Patents 2,890,174 and 2,899,335. Generally, the developer comprises a liquid combination of mutually compatible ingredients which, when brought into contact with an electrostatic latent image, will deposit upon the surface of the image in an image-wise configuration. In its simplest form, the composition comprises a finely divided opaque pigmented powder, a high resistance liquid and an ingredient to prevent agglomeration. Liquids which have been found suitable include such organic dielectric liquids as carbon tetrachloride, kerosene, trichloroethylene, and any substituted hydrocarbon having a boiling point between about 70 and 200° C. Any of the finely divided opaque solid materials known in the art, similar to the pigments mentioned above, such as carbon black, talcum powder, or other pigments may be used in the liquid developer. Silica aerogel, commercially available from Monsanto Chemical Company, is a deagglomeration ingredient generally used. However, any conventional and/or suitable ingredient known to be useful by the prior art in a liquid development system may be utilized.

It is to be understood that it is not intended that the structural arangement of the apparatus described in the present invention be restricted to the design or configuration as set out herein, and it is intended to include all similar arrangements which will satisfy the requirements of the present invention. For example, the xerographic conversion cylinder as it appears in FIGURE 1 may be replaced wth a belt-like configuration, as in FIGURE 2, in which instance, full frame exposure can be substituted for the slit exposure technique employed when the cylindrical apparatus is used.

Any suitable radiation sensitive imaging system may be used in the course of the present invention. Typical such systems are the thermographic processes, photothermographic processes, the diazo processes, photochromic processes, exposure to photosensitive glasses, electrophotoconductive imaging systems, silver halide processes, and electrophoretic imaging. It is preferred and recommended, as stated above, that in order to get maximum gain when employing the conversion system herein described, that the present invention be utilized in conjunction with the diazo, photochromic, and thermographic ssytems.

To further define the specifics of the present invention, the following examples are intended to illustrate and not limit the particulars of the present system. Parts and percentages are by weight unlesss otherwise indicated. The examples are also intended to illustrate various preferred embodiments of the present invention.

EXAMPLE I

The inner surface of a glass cylinder having an inside diameter of about 12 inches, a thickness of about 50 mils, and a width of about 9 inches is spray coated with a 20% solution of tin oxide in acetone to form a layer about 5 microns thick and heated to a temperature of about 600° F. for about 30 seconds. To this is applied by vacuum deposition a layer of an 80% selenium-20% arsenic alloy about 10 microns thick. The coated inner surface of the drum is then charged to about +400 volts by means ofa laboratory corotron unit powered by a high voltage power supply. The charging current is about 0.1 of a milliamp at about 7,500 volts. The surface of the arsenic-selenium drum is selectively exposed to a light source consisting of a tungsten filament at about 2,800° K. for an exposure of about 0.1 to 0.5 foot-candle-seconds reflected from an opaque image. The electrostatic latent image produced is then developed with a non-fusible toner comprising polystyrene crosslinked with divinyl benzene containing a carbon black pigment. The developed image on the inner surface of the drum is then exposed to a quartz iodine infrared light source at a voltage of about 1350 volts and a current of about 8 amps, for about 4 seconds. A sheet of thermographic paper, commercially available from the Minnesota Mining and Manufacturing Company, mounted on an opaque base is contacted with the outside surface of the drum where the infrared exposure is carried out. As a result of the heat which is transferred by both radiation and conduction in the image areas to the thermographic sheet through the glass drum, the paper undergoes a color change, in the image areas. A high quality, positive image of the original document is obtained.

EXAMPLE II

An aluminized Mylar sheet, commercially available from E. I. du Pont de Nemours and Company, approximately 40 inches in length, nine inches wide, and 0.0035 of an inch thick, in an endless belt configuration is vacuum coated with about a 5 micron layer of polyvinyl carbazole which is predoped with 3,4,7-trinitrofluorenone. The coated surface of the belt is corona charged to about +400 volts by means of a laboratory corotron unit powered by a high voltage power supply. The charged surface of the sheet is selectively exposed to a light source consisting of a tungsten filament at about 2,800° K. for an exposure of about 35 foot-candle-seconds reflected from an opaque image. The electrostatic latent image produced is then developed with a non-fusible toner comprising polystyrene containing a carbon black pigment. The developed image is then exposed to a 30 watt ultra-violet fluorescent light source for about 30 seconds. A sheet of commercial thermal diazo paper, available from General Aniline & Film Corporation, is contacted with the outer surface of the Mylar belt where the image is under exposure to the ultra-violet radiation, thereby deactivating the diazo paper in the non-image areas. The exposed diazo paper is then removed from the apparatus of the present invention and heated to a temperature of about 175° C. for approximately 15 seconds thereby producing an image of the original document. A good positive image of the original is obtained.

EXAMPLE III

The process of Example II is repeated excepting a photochromic paper, commercially available from Copymation, Inc., Chicago, Ill., is substituted for the thermo-diazo paper. The ultra-violet radiation strikes the photochromic paper in the background areas causing it to change from its original colorless state to that of a violet color, thereby producing a negative image of the original document. The quality of the image produced is similar to that obtained when using the diazo paper.

EXAMPLE IV

The process of Example II is repeated excepting the developed image on the inner surface of the belt is exposed to a commercial thermographic paper by way of an infrared light source as in Example I. A good positive image of the original document is obtained similar to that of Example I.

Although the present examples were specific in terms of conditions and materials used, any of the above listed typical materials may be substituted when suitable in the above examples with similar results. In addition to the steps used in the conversion system of the present invention, other steps or modifications may be used, if desirable. For example, the apparatus may be used as a duplicating system as well as a copying and display system. In addition, other materials may be incorporated in the support, photoconductive material, developer, or apparatus which will enhance, synergize, or otherwise desirably effect the properties of the systems for their present use. For example, the spectral sensitivity of the photoconductive drum used in accordance with the present invention may be modified by incorporating photosensitizing dyes therein.

Anyone skilled in the art will have other modifications occur to him based on the teaching of the present invention. These modifications are intended to be encompassed within the scope of this invention.

What is claimed is:

1. An image conversion apparatus comprising in combination an optically transparent, continuous photoconductive member, means to rotate said member, means for depositing an electrostatic charge on the surface of said member, means to project a light image onto said surface thereby forming an electrostatic latent image, means to develop said electrostatic latent image and means to expose said developed image to a radiation sensitive image support member, said exposure means comprising infrared, ultraviolet and visible radiation sources situated internal to said photoconductive member with said radiation sensitive member located external to said photoconductor member.

2. The apparatus as disclosed in claim 1 wherein said continuous member comprises a photoconductive cylinder comprising a transparent conductive support coated with a transparent photoconductive layer.

3. The apparatus as disclosed in claim 1 wherein said continuous member comprises a photoconductive endless belt comprising a transparent conductive support coated with a transparent photoconductive layer.

4. The apparatus as described in claim 1 further including means for restoring the surface of said photoconductive member.

References Cited

UNITED STATES PATENTS

| | | | |
|---|---|---|---|
| 2,843,084 | 7/1958 | Hayford | 95—1.7 X |
| 3,051,044 | 8/1962 | McNaney | 95—1.7 X |
| 3,142,561 | 7/1964 | Magnus | 95—1.7 X |
| 3,168,857 | 2/1965 | Hutto | 95—1.7 |

JOHN M. HORAN, Primary Examiner

U.S. Cl. X.R.

355—5